United States Patent [19]

Stolzer

[11] 4,305,318

[45] Dec. 15, 1981

[54] POWER FRAME SAW

[75] Inventor: Paul Stolzer, Achern, Fed. Rep. of Germany

[73] Assignee: Keuro Maschinenbau Gesellschaft mit beschränkter Haftung & Co. Kommanditgesellschaft, Achern, Fed. Rep. of Germany

[21] Appl. No.: 148,173

[22] Filed: May 8, 1980

[30] Foreign Application Priority Data

May 25, 1979 [DE] Fed. Rep. of Germany ....... 2921189

[51] Int. Cl.³ .................... B23D 49/04; B23D 51/20
[52] U.S. Cl. ...................................... 83/375; 83/452; 83/756; 83/757; 83/759; 83/647
[58] Field of Search ................ 83/756, 759, 757, 375, 83/452, 647, 754, 755, 370, 360

[56] References Cited

U.S. PATENT DOCUMENTS

| 3,280,683 | 10/1966 | Djurberg | 83/647 X |
| 3,288,008 | 11/1966 | Stolzer | 83/647 X |
| 3,492,902 | 2/1970 | Stolzer | 83/647 X |
| 3,991,644 | 11/1976 | Sugimoto | 83/370 X |

Primary Examiner—Frank T. Yost
Attorney, Agent, or Firm—Spencer & Kaye

[57] ABSTRACT

In a power frame saw having a machine frame, workpiece clamping jaws mounted on the machine frame and relatively movable for clamping a workpiece in a fixed position, a guide member pivotally mounted with weight balancing on the machine frame, a saw bow mounted on the guide member to undergo reciprocating movement in a given direction relative to the guide member, a saw blade held in the bow to extend at an oblique angle to the direction of movement, a drive system connected for imparting such reciprocating movement to the bow to cause the saw blade to perform successive cutting and return strokes, and components for controlling pivotal movement of the guide means relative to the machine frame and including a source of hydraulic pressure fluid, and an adjustment device responsive to the spacing between the clamping jaws to control the advance of the saw blade into the workpiece during each successive cutting stroke.

6 Claims, 7 Drawing Figures

POWER FRAME SAW

BACKGROUND OF THE INVENTION

The present invention relates to a power frame saw of the type having a machine frame and workpiece clamping jaws, as described in U.S. Pat. No. 3,492,902.

Such a known machine permits a setting of the charging piston stroke and the cutting pressure valve in dependence upon the inclination of the pivotably articulated saw parts, for thickwalled workpiece cross sections. For this purpose, stated briefly, the stroke of the charging piston and the setting of the cutting pressure valve are varied with the aid of a control cam in dependence upon the inclination angle of the pivotable saw parts. This however requires that for the practically occurring workpiece cross sections a corresponding number of interchangeable control cams must be kept available for installation. Thus, firstly, the purchase costs are high and, secondly, operating errors are likely. Therefore, the need exits for a simpler way of taking account of different workpiece cross sections, especially for the cases where simpler automatic saws are used and where relatively small numbers of pieces are to be cut from one cross section.

Moreover, in the known power frame saw the charging piston, irrespective of the size of the workpiece cross section, always carries out the stroke which is possible due to its actuation apparatus. This stroke suffices for small cross sections for economical sawing, while for large workpiece cross section, on account of the cutting resistance, it has the consequence that a more or less large part of the pressure medium delivered in each case by the charging piston is forced away again by way of the cutting pressure valve during the working stroke. Thus in practice pressure medium is delivered unnecessarily with every saw frame stroke, which signifies an unnecessary power consumption and a considerable heating of the hydraulic pressure medium. Furthermore overcontrolling is possible in that, during the return stroke, when the charging piston is delivering pressure medium for the application of the saw blade, the saw blade is applied to the workpiece too early.

SUMMARY OF THE INVENTION

Based on a power frame saw of the initially described type, it is an object of the present invention to make possible automatic adjustment of the stroke of the charging piston, for the application of the saw blade in the direction towards the workpiece, to the value which corresponds to the requirements for the workpiece cross section.

A further object of the invention is to effect such adjustment in a simple manner and with security against operating errors by untrained personnel.

It is further intended to provide for the possibility of retaining the means provided in the known equipment for taking account of the stroke position of the saw frame in regard to the controlling of the cutting pressure valve.

The objects of the invention are achieved, in a power frame saw having a machine frame, workpiece clamping means mounted on the machine frame and composed of clamping jaws which are relatively movable for clamping a workpiece in a fixed position, guide means pivotally mounted with weight balancing on the machine frame, a saw bow mounted on the guide means to undergo reciprocating movement in a given direction relative to the guide means, a saw blade held in the bow to extend at an oblique angle to the direction of movement, drive means connected for imparting such reciprocating movement to the bow to cause the saw blade to perform successive cutting and return strokes, and means for controlling pivotal movement of the guide means relative to the machine frame and including a source of hydraulic pressure fluid, a main piston-cylinder unit mechanically connected between the machine frame and the guide means and presenting a hydraulic chamber connected to receive fluid from the source for producing a force tending to pivot the guide means relative to the machine frame, and a charging piston-cylinder unit connected between the hydraulic pressure fluid source and the main piston-cylinder unit chamber and operatively associated with the drive means for delivering a quantity of fluid to the main piston-cylinder unit during each return stroke to advance the saw blade into the workpiece during each successive cutting stroke, by the provision of adjustment means responsive to the spacing between the clamping jaws and connected to control the stroke of the charging piston-cylinder unit for causing the magnitude of the quantity of fluid delivered to the main piston-cylinder unit during each return stroke to be an inverse function of the spacing between the clamping jaws, whereby when the jaws are farthest apart for holding the largest workpiece the magnitude of the fluid quantity is a minimum and when the jaws are closest together for holding the smallest workpiece the magnitude of the fluid quantity is a maximum.

The structure according to the invention serves to cause the clamping of the workpiece in between the clamping jaws of the power frame saw to automatically set the stroke of the charging piston appropriate to the workpiece cross section, without need of special technical knowledge-requiring activity for this purpose.

DESCRIPTION OF THE PREFERRED EMBODIMENTS

Figure 1:
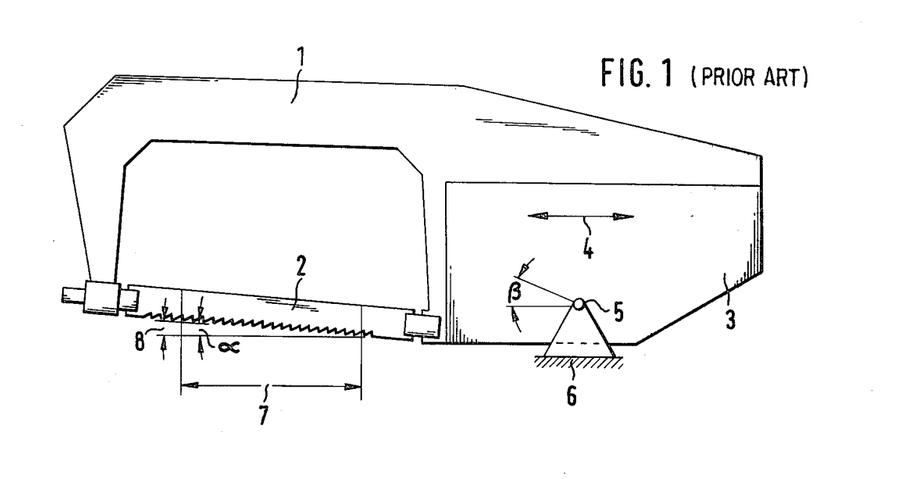
FIG. 1 is a side elevational view of a known hack saw, or frame saw, machine.

FIG. 1 shows a saw frame, or bow, 1 with obliquely clamped-in saw blade 2. Frame 1 is driven relative to saw frame guide 3 at its rear part to undergo a to and fro movement in the direction 4. The saw frame guide is pivotable about a pivot bearing 5 which is situated on the machine frame 6. The cutting edge of blade 2 lies at an angle α to sawing direction 4 and the saw frame guide can be pivoted to an angular orientation β, about bearing 5, relative to a reference direction. During reciprocating movement of the saw frame 1 in direction 4, the saw blade 2 executes a stroke of length 7, and a maximum rate of feed 8 dependent upon the oblique orientation α of the saw blade 2.

Figure 2:
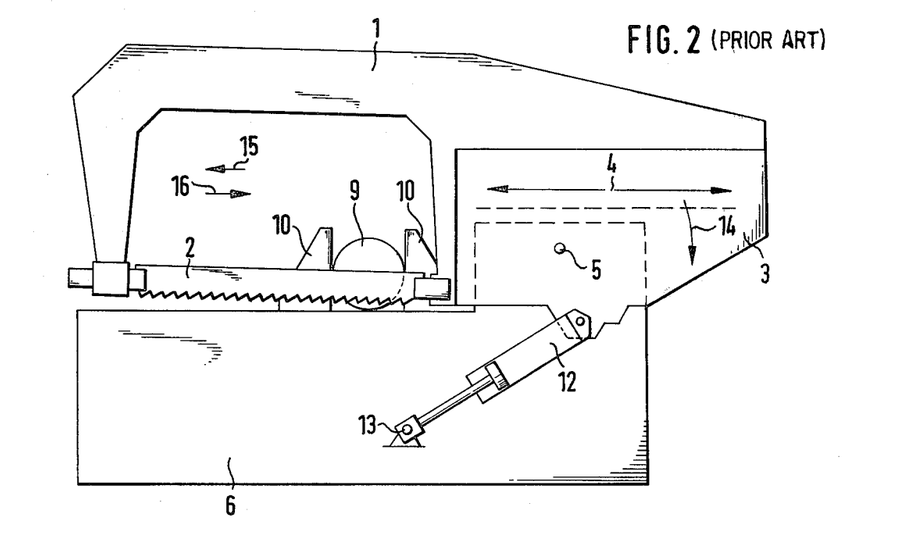
FIG. 2 is a side elevational view of one known embodiment of the machine of FIG. 1.

In FIG. 2 the saw frame 1 is shown with its guide, which again is pivotable about the pivot bearing 5. The saw blade 2 cuts through a workpiece 9 which is clamped in between vise jaws 10. At a distance from the pivot bearing 5 a main cylinder-piston unit 12 is articulated which is pivotally secured via its piston rod 13 to the machine frame 6. The pivot bearing 5 is positioned so that the center of gravity of the saw frame 1, with saw frame guide, is situated, in FIG. 2, on the right in relation to the pivot bearing 5, that is to say so that a torque resulting from the weight of frame 1 acts in the direction of the arrow 14 upon the saw frame guide.

In FIG. 2, moreover, the working stroke of blade 2 takes place in direction 15 and the return stroke in the direction 16.

Figure 3:
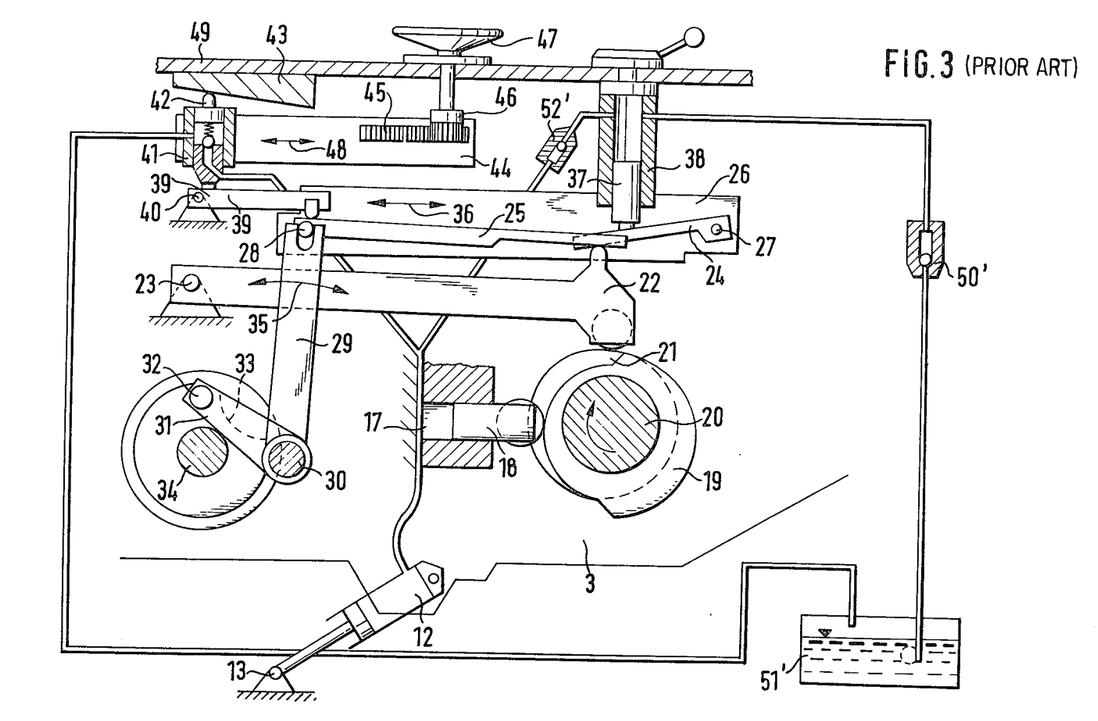
FIG. 3 is a partly cross-sectional, partly diagrammatic, side view of the hydraulic control system of the machine in FIG. 2.

FIG. 3 shows the control system of the power frame saw as illustrated in FIG. 2 and the control system of the main cylinder-piston unit 12.

The volume of a displacement chamber 17, which is hydraulically connected with the main cylinder-piston unit 12, can be varied by movement of a displacement piston 18. The axial movement of the displacement piston 18 is determined by a cam disc 19 which is fitted on a crank shaft 20. Likewise on the crank shaft 20 there is mounted an eccentric disc 21 which in its rotation pivots a roller lever 22 about its bearing 23. The roller lever 22 in turn presses upon an intermediate lever 24 and a pivot lever 25. One end of intermediate lever 24 is mounted on a carriage 26 via a pivot bearing 27. The pivot lever 25 is pivotally mounted at the opposite end of the carriage 26 via a pivot bearing 28. A control lever 29, which is pivotably mounted on a pivot pin 30, also engages at the bearing 28. A slide arm 31 is fixedly connected with the control lever 29 and carries at its end a roller 32 which moves along a control cam surface 33 of a cam plate with variations in the inclination of the articulated saw parts. The cam plate carrying surface 33 can be rotated on a pivot pin 34 but when the machine is in use is firmly connected with the machine frame 6 for example by means of bolts or index pins. If the control lever 29 is pivoted by the control cam surface 33 as indicated by the arrows 35, the carriage 26 is correspondingly shifted, as indicated at 36.

The piston 37 of a feed pump 38 bears on the intermediate lever 24. The feed pump 38 is connected in a known manner through suction valve 50' to a hydraulic fluid reservoir 51' and is hydraulically connected through a delivery check valve 52' with the main cylinder-piston unit 12 and the displacement chamber 17.

A setting lever 39, which is pivoted at bearing 40, presses upon the pivot lever 25 and is in turn acted upon by a valve piston slidable in a cutting pressure differential valve 41 which is connected hydraulically by its inlet to the main cylinder-piston unit 12 and the displacement chamber 17 and by its outlet to the reservoir 51'. Valve 41 includes a control plunger 42 which bears resiliently against a stationary cam 43. The cutting pressure valve 41 is fitted on a carriage 44 which is displaceable in the direction of the arrows 48, via a rack 45 and pinion 46, by means of a hand wheel 47. The cam 43, hand wheel 47 and feed pump 38 are fitted on a support 49 oriented at right angles to the saw frame guide.

In the operation of the power frame saw with thrusting working stroke, the saw blade, during the working stroke, in the direction 15, must bear upon the material 9 with a cutting pressure set in accordance with the hardness and thickness of the material, while during the idle stroke, in the direction of 16, it should be lifted away from the workpiece to preserve the teeth of the saw blade 2. With the saw blade 2 clamped in obliquely at the angle α in relation to the reciprocating movement direction 4 of the saw frame guide, then in a single working stroke 15 and with straight-line movement of the saw frame 1, a maximum feed movement 8 results. However a cutting movement which is not straight but arcuate is advantageous, and is achieved by pivoting the saw frame guide about its pivot bearing 5, in the clockwise direction in the plane of the drawing in FIGS. 1 to 3, in such a manner that less than the maximum feed motion 8 is produced.

The lifting of the saw blade 2 away from the workpiece 9 and its reapplication are effected by action of the main cylinder-piston unit 12 with which the feed motion is also set and the cutting pressure produced. This main cylinder-piston unit 12 and the feed pump 38 are hydraulically connected with the displacement chamber 17. The volume of this displacement chamber 17 is varied by shifting the displacement piston 18. If the volume of the displacement chamber 17 is increased by shifting the displacement piston 18 to the right, the saw blade 2, acted on by the torque 14, lifts away from the workpiece, while in the case of a reduction of this volume, a moment directed opposite to the torque 14 is exerted upon the saw frame guide, the saw blade 2 bearing with a corresponding pressure against the material 9. The reciprocating movement of the saw frame 1 is caused by a rotation of the crank shaft 20 on which the cam disc 19 is fitted.

When the cam disc 19 is in the position shown in FIG. 3, the saw frame is situated approximately at the midpoint of its idle stroke, and thus the volume of the displacement chamber 17 has been increased by a previous corresponding shifting of the displacement piston 18 to the right in FIG. 3. At the point of reversal from the idle stroke 16 to the working stroke 15, the radius of the cam disc 19 abruptly and substantially increases via a transition portion, so that the displacement piston 18 is forced to the left into the displacement chamber 17, the volume of the latter is reduced and hydraulic fluid is fed to the main cylinder-piston unit 12. Thus the saw blade 2 is applied against the workpiece 9 with a predetermined pressure. At the next point of reversal from the working stroke 15 to the idle stroke 16 the radius of the cam disc 19 decreases via corresponding transition part of the cam so substantially that the displacement piston 18 can yield to the pressure of the force exerted by the torque 14 upon the main cylinder-piston unit 12, whereby the saw frame guide pivots in the direction urged by the torque 14 about the pivot bearing 5 and the saw blade 2 lifts away from the workpiece 9. The cam part corresponding to the working stroke has a progressively decreasing radius, whereby an arcuate cutting course necessarily ensues for the saw blade 2 even when, e.g. during cutting of a workpiece of thin-walled cross section (not shown), no cutting force results which suffices for the opening of the cutting pressure valve 41.

Before commencement of a new working stroke 15, the saw blade 2 must be lowered in accordance with the desired feed motion per working stroke, this being achieved by pivoting the saw frame guide by a specific angular amount $\beta$ in the direction towards the workpiece. This is effected in that hydraulic fluid is pumped by the charging piston 37 from charging cylinder 38 into the main cylinder-piston unit 12, whereupon the same working cycle, working stroke with descending cutting pressure, lifting away of the saw blade and subsequent idle stroke 16, is repeated. For this purpose the charging piston 37 is actuated through the eccentric disc 21, fixed to disc 19, the roller lever 22 and the intermediate lever 24.

The eccentric disc 21, just like the cam disc 19, is secured on the crank shaft 20, and thus imparts one to-and-fro movement to the charging piston 37 per revolution of the crank shaft 20. Here the eccentric disc 21 is oriented in relation to the cam disc 19 so that the addition of fluid to the main cylinder-piston unit 12 begins at the beginning of the idle stroke and additional fluid can be supplied to cylinder 38, charging piston 37 being permitted to withdraw therefrom, over the duration of the working stroke.

A further possibility of influencing the feed motion consists in that the intermediate lever 24 is fitted on the carriage 26 which can be moved in the direction of the arrows 36 by the control lever 29. If for example the carriage 26 is moved to the left in the plane of FIG. 3, then the stroke amplitude of the charging piston 37 decreases and a smaller volume of fluid is pumped into the hydraulic circuit composed of the main cylinder-piston unit 12 and displacement chamber 17. Conversely the volume of fluid pumped in increases when carriage 26 is shifted to the right in in the plane of FIG. 3, and thus so does the feed motion.

The variability of the feed motion is exploited so as to remain always in the optimum feed motion range, even with a changing cross section of the material 9 to be severed. This is achieved in that the slide arm 31 travels with its roller 32 along the control cam path 33 when the saw frame guide is pivoted during sawing of the material 9. The control cam path 33 is firmly connected with the machine frame 6 while the control lever 29 is articulated to the saw frame guide. In the pivoting of the saw frame guide through a specific angle $\beta$ the control lever 29 is pivoted out to the left, relative to the guide of FIG. 3 by the sliding of the roller up on to the elevated portion of the control cam path 33, whereby the carriage 26 likewise moves to the left and thus a smaller stroke amplitude is established for the charging piston 37.

In FIG. 3 the control cam path 33 is represented as an approximately circularly curved elevation. In this form it is suitable for the severing of thick, round, solid material, since the initially large feed motion decreases as cutting progresses towards the middle of the material and is increased again after passing the middle. Of course it is possible to design optimum control cam paths correspondingly for other material cross sections, which cam paths in general effect a reduction in the case of thick cross sections, that is cross sections offering a high cutting resistance, and an increase of the feed motion in the case of cross sections with low cutting resistance.

The pivot lever 25 is also pivotally mounted at the bearing 28 on the carriage 26. This pivot lever 25 is likewise moved up and down by the roller lever 22 and moves the setting lever 39 with it. Beside the setting lever 39, which is pivotally mounted at the bearing 40, the differential pressure valve 41 is displaceably arranged on the carriage 44. The setting bolt 42 of the differential pressure valve 41 bears on a slideway 43. If the differential pressure valve 41 is moved to the right in the plane of FIG. 3 by rotation of the hand wheel 47 and corresponding shifting of the carriage 44, then, beside a variation of the pressure fluid throughflow caused by movement of the setting bolt 42, a variation of the stroke is caused since the point of support of the lower piston of the differential pressure valve 41 shifts from the region of the pivot point at bearing 40 toward region where the setting lever 39 is supported on the pivot lever 25. A larger stroke is also achieved if the carriage 26 is shifted to the left in the plane of FIG. 3 by movement of the control lever 29, that is when a smaller feed motion establishes itself at the same time, caused by the control cam 33. By appropriate dimensioning of pivot lever 25 and setting lever 39, due to this measure a satisfactory hydraulic weight equilibration of the reciprocating saw frame can be brought about.

The known apparatus as described hitherto permits individual adaptation to the workpiece cross section, to be worked. For this purpose, however, in each case the element defining cam path 33 must be replaced appropriately and a large number of cam path elements corresponding to the respective workpiece cross sections must be kept available. The apparatus shown in FIGS. 4 to 7, which replace parts of the device shown in FIG. 3 to enable differential pressure valve 41 to be directly set to the material to be worked and the charging piston 37 to be actuated directly by the eccentric disc 21, serves to counter this drawback with respect to the external cross section of the workpieces.

In FIGS. 4 to 7 reference numerals are repeated in so far as they identify components corresponding to those of FIGS. 1 to 3.

Figure 4:
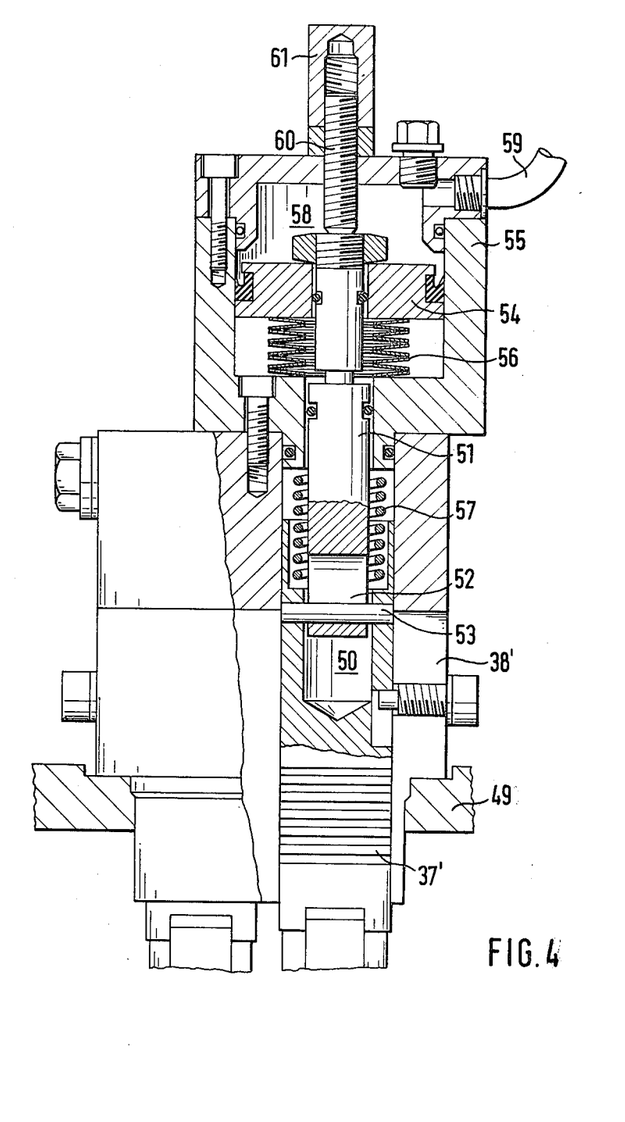
FIG. 4 is a cross-sectional view of a preferred embodiment of a charging piston with associated setting equipment according to the invention.
Figures 5, 6:
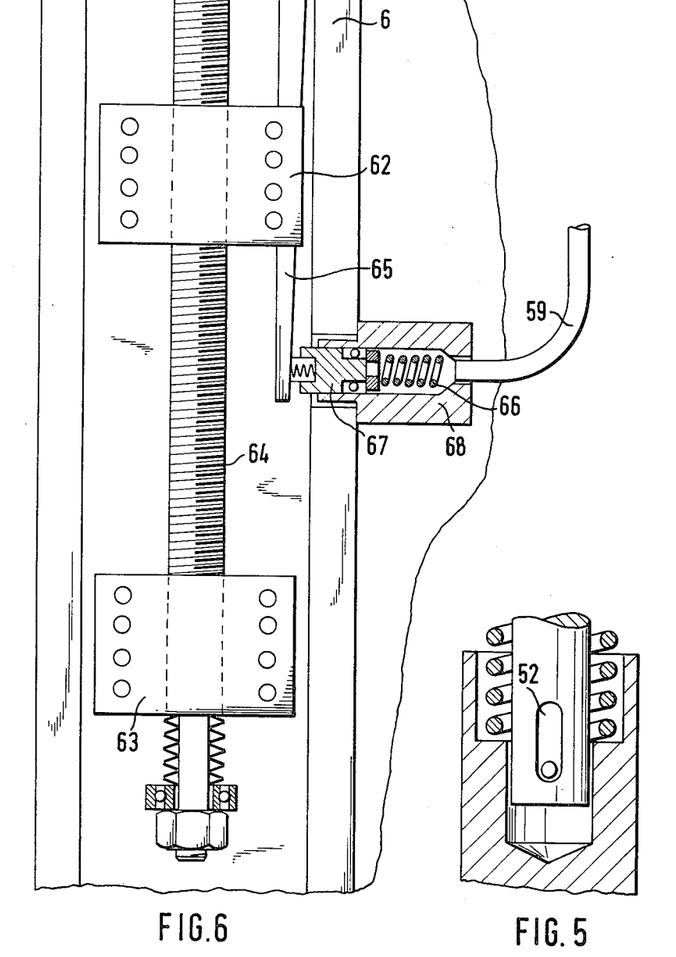
FIG. 5 is a cross-sectional detail view of a portion of the structure of FIG. 4.
FIG. 6 is a simplified elevational view, partly in cross section, of the clamping jaws of a power frame saw, with a further part of the setting equipment according to the invention.

FIG. 4 shows a charging piston 37' according to the invention which is movable in its housing 38' secured on the pivotable machine part 49 for the saw frame guide. The piston 37' has in its end directed into housing 38' an axial bore 50 in which a stop member 51 is axially displaceable. As also shown in FIG. 5, the stop member has a slot 52 extending in the axial direction of the piston 37' and through which extends a bolt 53 which is connected with the piston 37. The stop member 51 is connected to a piston 54 which is displaceable in a cylinder 55 flanged to the housing 38'.

The movement of the piston 54 in the direction toward the housing 38' takes place against the action of a pack 56 of dished springs which is supported against the cylinder 55. Movement of charging piston 37' toward cylinder 55 is similarly opposed by a spring 57 supported between cylinder 55 and piston 37'.

On the far side of the spring pack 56, the piston 54 forms with the cylinder 55 a pressure chamber 58 to which pressure medium can be supplied through a conduit 59. This pressure medium supply effects a more or less extensive downward movement of the stop member 51, imparting, correspondingly, more or less freedom of stroke to the piston 37'.

More specifically, if the apparatus of FIG. 3 were modified in accordance with FIGS. 4–6, and a specific stroke is imparted to the charging piston 37', by the eccentric 21 and the lever 24, it can carry out this stroke only so far as the position of the stop member 51 or its slot 52 gives it freedom to do so. If, referring to FIG. 4, the stop member 31 is in a relatively elevated position, the charging piston 37' under the action of the spring 57 cannot completely accompany the downward movement defined by the radial taper of the eccentric 21, so that the stroke which can be communicated per se to the charging piston 37' by these parts is limited. If, referring again to FIG. 4, the stop member 51 is in a lower position, the movement of piston 37' can proceed so far that the piston carries out the full stroke movement communicable to it by the lever 24 and the eccentric 21. It is thus evident from this extreme case that the maximum extent of the slot 52 corresponds to the maximum stroke to be executed by the charging piston 37' in specific cases.

Above the piston 54 there are also situated setting means, supported on the cylinder 55, in the form of a threaded rod 60 and a setting nut 61, by means of which it is possible to obtain a basic adjustment of the position of the stop member 51.

The setting value for the pressure medium volume present in the cylinder chamber 58 and thus the setting value for the axial position of the stop member 51 is derived by the device shown in FIG. 6, which is connected to the other end of conduit 59.

FIG. 6 shows in plan view the region of the clamping jaws 10 of FIG. 2, illustrating however the plane beneath the workpiece table on which the clamping jaws are mounted, where extension pieces 62 and 63 of jaws 10 protrude downward into the machine frame. A threaded spindle 64 passes through extension pieces 62 and 63 and is in threaded engagement with piece 62 so that pieces 62 and 63, and thus jaws 10, can be moved apart and together by rotation of this spindle. In this case the clamping jaw which is fixed to the extension piece 63 can be stationary, so that the threaded spindle 64 is mounted freely rotatably in it. Then only the clamping jaw fixed to the extension piece 62 is displaceable by rotation of the spindle. The movement of the latter clamping jaw 10 can naturally also be effected hydraulically by means of a cylinder-piston unit 12 or the like.

With the extension piece 62 of the clamping jaw 10 which is displaceable for the clamping-in of the workpiece there is firmly connected a cam piece 65, in the example as illustrated a straight-edge, against which bears a piston 67 under the action of a compression spring 66, which piston is displaceable in a cylinder 68 fixed on the machine frame 6. Fundamentally here, apart from fine details of the formation of the control cam piece 65, the arrangement is made so that the piston 67, relative to the view of FIG. 6, is in its position furthest to the left when the clamping jaws 10 of FIG. 2 are spaced furthest apart, and is in its position furthest to the right when the clamping jaws are closest to one another. Thus the displacement of the movable clamping jaw, through the piston 67, delivers a volume of pressure medium into the cylinder chamber 58 of FIG. 4 or withdraws a volume therefrom, which volume, in dependence upon the setting of the movable clamping jaw and thus in dependence upon the external cross section of the workpiece just to be worked in each case, sets the stop member 51 accordingly.

In the embodiment which is illustrated and described, when the clamping jaws 10 are driven far apart, the position of the stop member 51, with reference to FIG. 4, is at its upper limit, so that the stroke which is possible for and impartable to the charging piston 37 is limited to the minimum value. The converse is true for the case where the clamping jaws 10 are in their position closest to one another.

Figure 7:
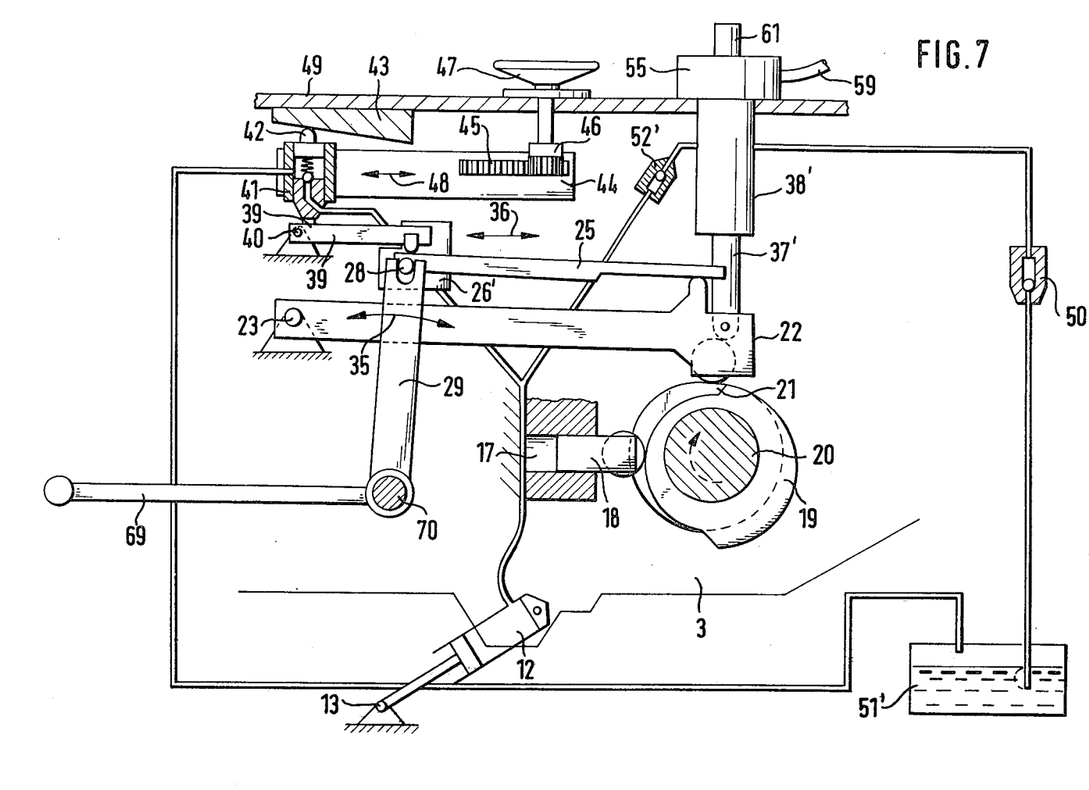
FIG. 7 is a view similar to that of FIG. 3 showing the control system according to FIG. 3 modified according to the invention.

In the embodiment of a control system according to the invention shown in FIG. 7, the hydraulic control system of FIG. 3 is supplemented by the structure shown in FIGS. 4 to 6, the charging piston 37' is pivotably connected directly to the roller lever 22 and thus is actuated directly by the control cam 21 via a follower roller also mounted on lever 22. On the other hand the influence upon the cutting pressure valve 41, provided by the control cam 21, is retained, for which purpose however the carriage 26' can now be made shorter than carriage 26. The positioning of the carriage 26' in in accordance with the workpiece can be effected by a hand lever 69 which is fixed to the control lever 29 and is pivotable about a bearing 70. Of course the possibility exits of also deriving the setting of the carriage 26' automatically from the setting of the clamping jaws 10, in a manner comparable with the stroke setting of the charging piston.

Otherwise the control system according to FIG. 7 corresponds to the control system as already described with reference to FIG. 3, insofar as there is conformity between the two control systems.

It will be understood that the above description of the present invention is susceptible to various modifications, changes and adaptations, and the same are intended to be comprehended within the meaning and range of equivalents of the appended claims.

What is claimed is:

1. In a power frame saw having a machine frame, working clamping means mounted on the machine frame and composed of clamping jaws which are relatively movable for clamping a workpiece in a fixed position, guide means pivotally mounted with weight balancing on the machine frame, a saw bow mounted on the guide means to undergo reciprocating movement in a given direction relative to the guide means, a saw blade held in the bow to extend at an oblique angle to the direction of movement, drive means connected for imparting such reciprocating movement to the bow to cause the saw blade to perform successive cutting and return strokes, and means for controlling pivotal movement of the guide means relative to the machine frame and including a source of hydraulic pressure fluid, a main piston-cylinder unit mechanically connected between the machine frame and the guide means and presenting a hydraulic chamber connected to receive fluid from the source for producing a force tending to pivot the guide means relative to the machine frame, a displacement piston-cylinder unit defining a hydraulic chamber connected in fluid communication with the main piston-cylinder unit chamber, a cam drive system rotating with the drive means and connected to act on the displacement piston-cylinder unit in a manner to vary the volume of its hydraulic chamber for cyclically causing the force with which the guide means presses the blade against the workpiece to decrease during each return stroke and increase during each cutting stroke, a cutting pressure regulating valve connected to the hydraulic chambers for maintaining the fluid pressure therein below a selected maximum value, and a charging piston-cylinder unit presenting a chamber connected between the hydraulic pressure fluid source and the main piston-cylinder unit chamber and operatively associated with the cam drive system for delivering a quantity of fluid to the main piston-cylinder unit during each return stroke to advance the saw blade into the workpiece during each successive cutting stroke, the improvement comprising adjustment means responsive to the spacing between the clamping jaws and connected to control the stroke of said charging piston-cylinder unit for causing the magnitude of the quantity of fluid delivered to said main piston-cylinder unit during each return stroke to be an inverse function of the spacing between the clamping jaws, whereby when the jaws are farthest apart for holding the largest workpiece the magnitude of the fluid quantity is a minimum and when the jaws are closest together for holding the smallest workpiece the magnitude of the fluid quantity is a maximum.

2. An arrangement as defined in claim 1 wherein said charging piston-cylinder unit is made up of a charging piston displaceable in an associated charging cylinder; said charging piston is provided with an axial bore at its end directed into said charging cylinder, and said adjustment means comprised a stop member displaceably held in said bore and connected to be at least indirectly displaceable in response to the spacing between said clamping jaws.

3. An arrangement as defined in claim 2 wherein said stop member is provided with a slot passing through said member transversely of the axis of said charging piston and elongated in the direction of said charging piston axis, and said charging piston is provided with a bolt traversing its bore transversely to its axis and extending through said slot, whereby the dimension of said slot in the direction of the axis of said charging piston determines the maximum displacement of said charging piston relative to said stop member.

4. An arrangement as defined in claim 2 wherein said adjustment means further comprise: means defining a control cylinder fixed to said machine frame; a control piston movably disposed in said control cylinder and fastened to said stop member in a manner such that said stop member projects from one side of said control piston, while the other side of said control piston defines a pressure chamber with said control cylinder, spring means mounted between said one side of said control piston and the mutually facing end of said control cylinder for urging said control piston in the direction of said pressure chamber; a further piston-cylinder unit defining a second pressure chamber and connected to respond to the relative spacing between said clamping jaws for generating a pressure representative thereof in said second chamber; and means establishing fluid communication between said pressure chambers.

5. An arrangement as defined in claim 4 wherein: said adjustment means further comprise a setting cam movable with one of said clamping jaws, with the other of said clamping jaws being fixed relative to said further piston-cylinder unit; and said further piston cylinder unit is mounted to be acted upon by said setting cam for causing the pressure generated by said further piston-cylinder unit to be determined by the position of said setting cam relative thereto.

6. An arrangement as defined in claim 2,3,4, or 5 wherein said charging piston-cylinder unit further comprises a compression spring mounted between said end of said charging piston directed into said charging cylinder and the mutually facing end of said charging cylinder.

* * * * *